(12) United States Patent
Xie

(10) Patent No.: US 12,556,692 B2
(45) Date of Patent: Feb. 17, 2026

(54) DECODING METHOD, ENCODING METHOD, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventor: Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/785,676

(22) Filed: Jul. 26, 2024

(65) Prior Publication Data
US 2024/0388700 A1 Nov. 21, 2024

Related U.S. Application Data

(63) Continuation of application No. PCT/CN2022/074711, filed on Jan. 28, 2022.

(51) Int. Cl.
| | |
|---|---|
| *H04N 19/11* | (2014.01) |
| *H04N 19/105* | (2014.01) |
| *H04N 19/159* | (2014.01) |
| *H04N 19/172* | (2014.01) |
| *H04N 19/176* | (2014.01) |

(Continued)

(52) U.S. Cl.
CPC .......... *H04N 19/11* (2014.11); *H04N 19/105* (2014.11); *H04N 19/159* (2014.11);
(Continued)

(58) Field of Classification Search
CPC .... H04N 19/11; H04N 19/105; H04N 19/159; H04N 19/172; H04N 19/176; H04N 19/463; H04N 19/593; H04N 19/182
(Continued)

(56) References Cited

U.S. PATENT DOCUMENTS

2022/0159311 A1* 5/2022 Meardi ................ H04N 19/186

FOREIGN PATENT DOCUMENTS

| CN | 113841410 A | 12/2021 |
|---|---|---|
| WO | 2020244610 A1 | 12/2020 |
| WO | 2021244935 A1 | 12/2021 |

OTHER PUBLICATIONS

Abdoli et al., ATEME, British Broadcasting Corporation, "Non-CE3: Decoder-side Intra Mode Derivation with Prediction Fusion Using Planar", Joint Video Experts Team (JVET) of ITU-T SG 16 WP 3 and ISO/IEC JTC 1/SC 29/WG 11, JVET-O0449-v2, dated Jul. 3-12, 2019, 9 pages.

(Continued)

*Primary Examiner* — Nguyen T Truong
(74) *Attorney, Agent, or Firm* — Sheppard, Mullin, Richter & Hampton LLP

(57) ABSTRACT

Embodiments of the present disclosure provide a decoding method, an encoding method, and a non-transitory computer-readable storage medium. The decoding method includes the following. An intra prediction mode parameter is obtained, where the intra prediction mode parameter indicates that an intra prediction value is determined using a derivation mode. At least one first intra prediction mode is determined according to the derivation mode. A matrix weighted intra prediction (MIP) mode for a first current block is determined. An intra prediction value of the first current block is determined according to the at least one first intra prediction mode and the MIP mode.

20 Claims, 7 Drawing Sheets

(51) Int. Cl.
   *H04N 19/463* (2014.01)
   *H04N 19/593* (2014.01)
   *H04N 19/182* (2014.01)

(52) U.S. Cl.
   CPC ......... *H04N 19/172* (2014.11); *H04N 19/176* (2014.11); *H04N 19/463* (2014.11); *H04N 19/593* (2014.11); *H04N 19/182* (2014.11)

(58) Field of Classification Search
   USPC .................................................... 375/240.12
   See application file for complete search history.

(56) References Cited

OTHER PUBLICATIONS

Pfaff et al., Fraunhofer HHI, "CE3: Affine linear weighted intra prediction (CE3-4.1, CE3-4.2)", Joint Video Experts Team (JVET) of ITU-T SG 16 WP 3 and ISO/IEC JTC 1/SC 29/WG 11, JVET-N0217, dated Mar. 19-27, 2019, 17 pages.

International Search Report and Written Opinion for International Application No. PCT/CN2022/074711 mailed on Nov. 1, 2022, 19 pages (with English translation).

Zhang Ziqiu et al., "Improving VVC Intra Coding via Probability Estimation and Fusion of Multiple Prediction Modes" International Conference on Image and Graphics, 2021. 11 pages.

Fraunhofer HHI "Non-CE3: MIP cleanup" Joint Video Experts Team (JVET) of ITU-T SG 16 WP 3 and ISO/IEC JTC 1/SC 29/WG 11 JVET-P0398-v1, dated Oct. 1-11, 2019. 5 pages.

Muhammed Coban et al., "Algorithm description of Enhanced Compression Model 3 (ECM 3)" Joint Video Experts Team (JVET) of ITU-T SG 16 WP 3 and ISO/IEC JTC I/SC 29 JVET-X2025, dated Jul. 7-16, 2021. 28 pages.

Extended European Search Report issued in corresponding EP application No. 22922810.1 dated Oct. 14, 2025. 12 pages.

\* cited by examiner

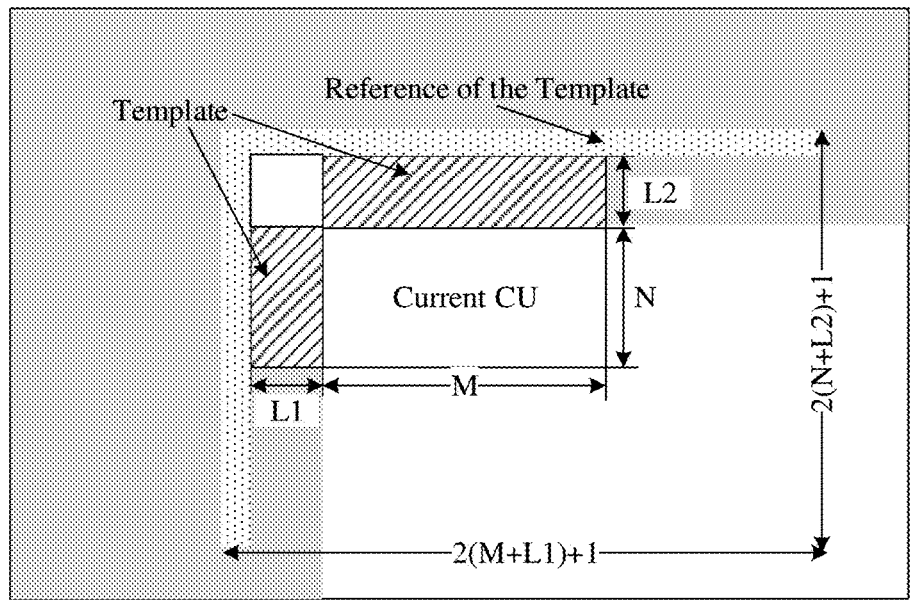

OBTAIN INTRA PREDICTION MODE PARAMETER FOR INDICATING THAT INTRA PREDICTION VALUE IS DETERMINED USING DERIVATION MODE —310

DETERMINE AT LEAST ONE FIRST INTRA PREDICTION MODE ACCORDING TO DERIVATION MODE —320

DETERMINE MIP MODE FOR FIRST CURRENT BLOCK —330

DETERMINE INTRA PREDICTION VALUE OF FIRST CURRENT BLOCK ACCORDING TO AT LEAST ONE FIRST INTRA PREDICTION MODE AND MIP MODE —340

FIG.7

| Above Left Reconstructed Block | Above Reconstructed Block | Above Right Reconstructed Block |
|---|---|---|
| Left Reconstructed Block | Current Block | |
| Bottom Left Reconstructed Block | | |

FIG.8

| Above Left Unreconstructed Block | Above Reconstructed Block | Above Right Reconstructed Block |
|---|---|---|
| Left Unreconstructed Block | Current Block | |
| Bottom Left Unreconstructed Block | | |

DECODING METHOD, ENCODING METHOD, AND NON-TRANSITORY COMPUTER-READABLE STORAGE MEDIUM

CROSS REFERENCE TO RELATED APPLICATION(S)

This application is a continuation of International Application No. PCT/CN2022/074711, filed Jan. 28, 2022, the entire disclosure of which is incorporated herein by reference.

TECHNICAL FIELD

Embodiments of the present disclosure relate to the field of video coding, and more particularly, to a decoding method, an encoding method, and a non-transitory computer-readable storage medium.

BACKGROUND

Digital video compression technology is mainly to compress a huge amount of digital imaging video data, so as to facilitate transmission, storage, or the like. With the proliferation of videos on the Internet and the higher demand for video definition, although existing digital video compression standards can save a lot of video data, it is still necessary to pursue better digital video compression technology to reduce a burden on bandwidth and traffic for transmitting a digital video.

Currently, the joint video exploration team (JVET) has set up a research group on a coding model beyond the next generation video coding standard H.266/versatile video coding (VVC), and has named this model, i.e., platform testing software, ECM. ECM begins to receive newer and more efficient compression algorithms based on the reference software testing platform for VVC (VVC TEST MODEL, VTM) 10. How to further improve the performance of video coding is an urgent problem to be solved.

SUMMARY

In first aspect, a decoding method is provided. The method includes the following. An intra prediction mode parameter is obtained, where the intra prediction mode parameter indicates that an intra prediction value is determined using a derivation mode. At least one first intra prediction mode is determined according to the derivation mode. A matrix weighted intra prediction (MIP) mode for a first current block is determined. An intra prediction value of the first current block is determined according to the at least one first intra prediction mode and the MIP mode.

In a second aspect, an encoding method is provided. The method includes the following. At least one first intra prediction mode is determined according to a derivation mode. A MIP mode for a first current block is determined. An intra prediction value of the first current block is determined according to the at least one first intra prediction mode and the MIP mode. An intra prediction mode parameter is signalled into a bitstream, where the intra prediction mode parameter indicates that the intra prediction value is determined using the derivation mode.

In a third aspect, a non-transitory computer-readable storage medium is provided. The non-transitory computer-readable storage medium stores a bitstream. The bitstream is generated according to the encoding method in the second aspect.

BRIEF DESCRIPTION OF THE DRAWINGS

FIG. 6 illustrates an example of a process of generating a prediction value via TIMD.
FIG. 7 is a schematic flowchart of a decoding method provided in embodiments of the disclosure.
FIG. 8 illustrates an example of reconstructed blocks surrounding the current block;
FIG. 9 illustrates another example of reconstructed blocks surrounding the current block.

DETAILED DESCRIPTION

The following will describe technical solutions of embodiments of the disclosure with reference to the accompanying drawings in embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

The technical solutions in embodiments of the disclosure will be described with reference to the drawings in embodiments of the disclosure.

The present disclosure is applicable to the field of video coding. First, the coding framework to which embodiments of the present disclosure can be applied will be described with reference to FIG. 1 and FIG. 2. The coding framework is a block-based hybrid coding framework adopted by the current unified video coding standards.

Figure 1:
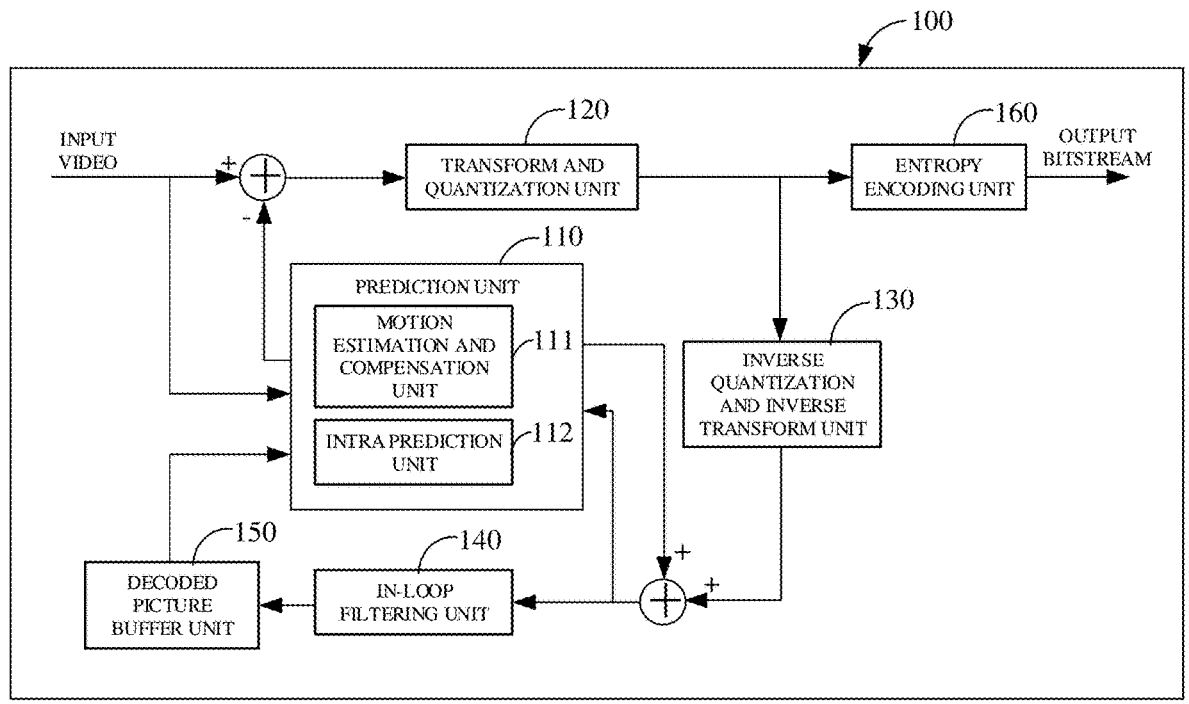
FIG. 1 is a schematic block diagram of an encoder provided in embodiments of the disclosure.

FIG. 1 is a schematic block diagram of an encoder 100 provided in embodiments of the disclosure. As illustrated in FIG. 1, the encoder 100 may include a prediction unit 110, a transform and quantization unit 120, an inverse quantization and inverse transform unit 130, an in-loop filtering unit 140, a decoded picture buffer (DPB) unit 150, and an entropy encoding unit 160.

Optionally, in the encoder 100, a video segment, a picture or a series of pictures may be partitioned into basic units referred to as coding tree units (CTUs), which may be further partitioned into smaller blocks referred to as coding units (CUs). CUs may be further partitioned into prediction units (PUs), or the like, which is not limited herein. The coding block may be transmitted to the prediction unit 110.

Generally, the prediction unit 110 may include a motion estimation and compensation unit 111 and an intra prediction unit 112. The prediction unit 110 may use the motion estimation and compensation unit 111 to obtain an inter prediction value of the current block (e.g., a CU). The intra prediction unit 112 may be used to obtain an intra prediction value of the current block. For example, the intra prediction unit 112 may obtain an intra prediction value based on a derivation mode, or the like.

Due to the strong correlation between adjacent pixels in one frame of the video, the use of intra prediction in video coding technology can help to eliminate spatial redundancy between adjacent pixels. Due to the strong similarity between adjacent frames in the video, the use of inter prediction in video coding technology can help to eliminate temporal redundancy between adjacent frames, thus improving the coding efficiency.

The prediction unit 110 outputs a prediction value of the current block, and then an adder can be used to calculate a difference (i.e., a residual value) between the original value of the current block and the prediction value of the current block. The transform and quantization unit 120 can read the residual value and perform one or more transform operations on the residual value to obtain the coefficient, and further quantize the coefficient and output the quantized coefficient (i.e., level). The inverse quantization and inverse transform unit 130 performs a scaling operation on the quantized coefficient to output the reconstructed coefficient, and then performs one or more inverse transforms and outputs the residual value. Then an adder can be used to calculate a reconstructed value by adding the residual value outputted from the inverse quantization and inverse transform unit 130 and the prediction value of the current block from the prediction unit 110. The reconstructed value can be further outputted to the prediction unit 110 to be used as an intra prediction reference. After all blocks of the picture slice are reconstructed, the in-loop filtering unit 140 performs in-loop filtering on the reconstructed picture.

The output of the in-loop filtering unit 140 is a decoded picture. The decoded picture is buffered to the decoded picture buffer (DPB) unit 150. DPB unit 150 outputs a decoded picture according to timing and control information. Herein, the picture stored in the DPB unit 150 may also be used as a reference for the prediction unit 110 to perform the inter prediction or intra prediction. Finally, the entropy encoding unit 160 signals parameters (for example, block partition information, mode information or parameter information related to prediction, transform, quantization, entropy coding, loop filtering, and the like) from the encoder 100 which are necessary for decoding the picture into the bitstream, that is, the encoder 100 finally outputs the bitstream.

Further, the encoder 100 may include a processor and a memory including a computer program. When the processor reads and executes the computer program, the encoder 100 reads the input video and generates a corresponding bitstream. In addition, the encoder 100 may also be a computing device having one or more chips. These units implemented as integrated circuit on the chip have connection and data exchange functions similar to the corresponding units in FIG. 1.

Figure 2:
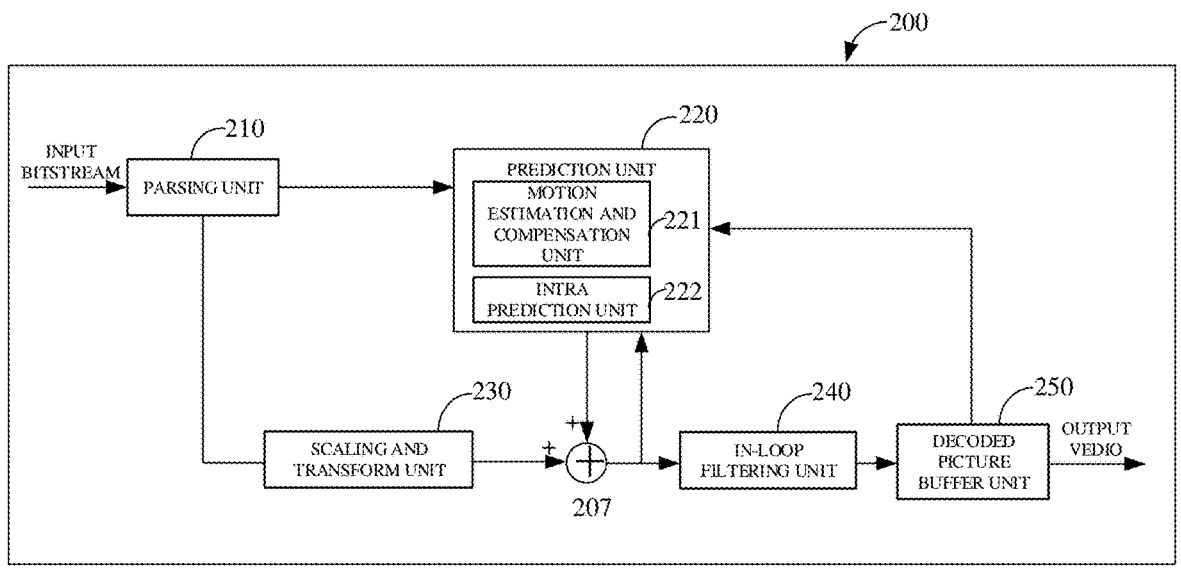
FIG. 2 is a schematic block diagram of a decoder provided in embodiments of the disclosure.

FIG. 2 is a schematic block diagram of a decoder 200 provided in embodiments of the disclosure. As illustrated in FIG. 2, the decoder 200 may include: a parsing unit 210, a prediction unit 220, a scaling and transform unit 230, an in-loop filtering unit 240, and a decoded picture buffer unit 250.

The input bitstream of the decoder 200 may be the bitstream output by the encoder 100. The parsing unit 210 parses the input bitstream, for example, based on the existing information, and determines block partition information, mode information or parameter information related to prediction, transform, quantization, entropy coding, loop filtering, and the like that are the same as those of the encoding side, thereby ensuring that the reconstructed picture obtained by the encoding side is the same as the decoded picture obtained by the decoding side. The parsing unit 210 transmits the obtained information to the unit of the decoder 200, for example, the prediction unit 220 and the scaling and transform unit 230.

The prediction unit 220 determines a prediction value of the current decoding block (e.g. CU or PU). Herein, the prediction unit 220 may include a motion estimation and compensation unit 221 and an intra prediction unit 222. Specifically, when it is indicated that an inter decoding mode is used for decoding the current decoding block, the prediction unit 220 passes the relevant parameters from the parsing unit 210 to the motion estimation and compensation unit 221 to obtain the inter prediction value. When it is indicated that an intra prediction mode is used for decoding the current decoding block, the prediction unit 220 transmits the relevant parameters from the parsing unit 210 to the intra prediction unit 222 to obtain the intra prediction value.

The scaling and transform unit 230 performs a scaling operation on the quantized coefficient (i.e., level) from the parsing unit 210 to obtain reconstructed coefficient, and performs one or more transform operations to obtain a residual value. An adder can be used to perform an addition operation on the prediction value from the prediction unit 220 and the residual value from the scaling and transform unit 230 to obtain a reconstructed value of the current decoding block. The reconstructed value can also be transmitted to the prediction unit 220 to be used as a reference for other blocks encoded in the intra prediction mode.

After all blocks of the picture are reconstructed, the in-loop filtering unit 240 performs in-loop filtering on the reconstructed picture. Herein, the output of the in-loop filtering unit 240 is a decoded picture, and the decoded picture is buffered to the decoded picture buffer unit 250. The decoded picture buffer unit 250 outputs a decoded picture according to timing sequences and control information. The picture stored in the decoded picture buffer unit 250 may also be used as a reference for the inter prediction or intra prediction performed by the prediction unit 220.

Further, the decoder 200 may include a processor and a memory including a computer program. When the processor reads and executes the computer program, the decoder 200 reads the input bitstream and generates a corresponding decoded video. In addition, the decoder 200 may also be a computing device having one or more chips. These units implemented as integrated circuit on the chip have connection and data exchange functions similar to the corresponding units in FIG. 2.

It is to be understood that the basic flow of a video encoder and decoder under a block-based hybrid encoding framework has been described above in conjunction with FIG. 1 or FIG. 2, and the encoder and decoder framework or basic flow is only used to illustrate and is not intended to limit embodiments of the present disclosure. For example, some modules or operations of the framework or process may be optimized as the technology evolves. In the specific implementation, the technical solution provided by the embodiments of the disclosure can be flexibly applied according to the actual requirements.

In embodiments of the disclosure, the current block, i.e. the current coding block, refers to the current CU, or the current PU, or other coding block, which is not limited herein.

In order for better understanding of embodiments of the disclosure, the intra prediction mode related to embodiments of the disclosure will be described.

Figure 3:
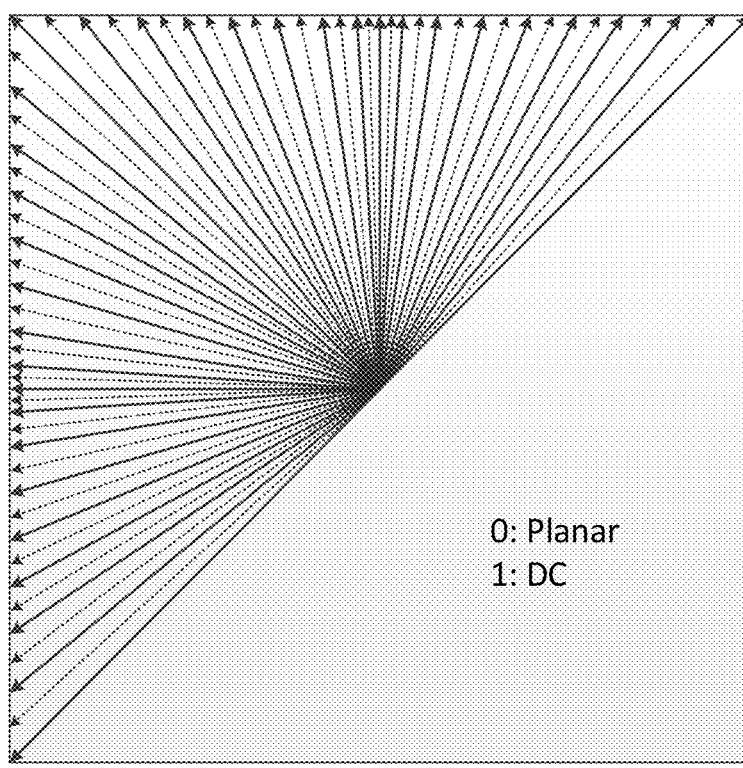
FIG. 3 illustrates an example of intra prediction modes in H.266/VVC.

In the intra prediction unit 112 of the encoder 100 or the intra prediction unit 222 of the decoder 200, the current coding block is typically predicted in various angular and non-angular modes to obtain a prediction value. According to rate-distortion information calculated from the prediction value and an original block, the prediction mode for the current coding unit is selected and transmitted to the decoder through a bitstream. The decoding side parses out the prediction mode, predicts and obtains the prediction picture of the current decoding block, and overlays the prediction picture with residual pixels transmitted through the bitstream to obtain a reconstructed picture. With the development of digital video coding standards in past generations, non-angular modes remain relatively stable, including the mean mode and planar mode. However, the number of angular modes increases continuously over the evolution of digital video coding standards. Taking the international digital video coding standard H series as an example, in H.264/AVC, there are only 8 angular prediction modes and 1 non-angular prediction mode. In H.265/HEVC, there expands to 33 angular prediction modes and 2 non-angular prediction modes. In H.266/VVC, the intra prediction mode includes a planar mode, a DC mode, and 65 angular modes. FIG. 3 illustrates a schematic diagram of 67 intra prediction modes in H.266/VVC. For a luma component, there is a matrix-weighted intra prediction (MIP) mode, and for a chroma component, there is a cross component linear model (CCLM) prediction mode.

Several intra prediction technologies related to embodiments of the present disclosure will be described below.

1) Decoder side intra mode derivation (DIMD). The core of this technology is deriving the intra prediction mode at the decoding side using the same method as the encoding side to avoid the transmission of the intra prediction mode index of the current coding unit in the bitstream, thereby saving bit overhead.

Specifically, DIMD can include two main operations. At the first operation, a prediction mode is derived, and the same prediction mode strength calculation method is used at both the encoding side and the decoding side. Taking ECM 2.0 as an example, the encoding side uses Sobel operator to calculate the histogram of gradients for each prediction mode. The action area covers the top three rows of adjacent reconstructed samples, the left three columns of adjacent reconstructed samples, and the corresponding top-left adjacent reconstructed samples of the current block. By calculating the histogram of gradients within this L-shaped region, the first prediction mode corresponding to the maximum amplitude and the second prediction mode corresponding to the second-maximum amplitude in the histogram can be obtained. The decoding side derives the first prediction mode and the second prediction mode using the same operations.

At the second operation, a prediction block is derived, and the same prediction block derivation mode is used at both the encoding side and the decoding side to obtain the current prediction block. Taking ECM2.0 as an example, the encoding side evaluates the following two conditions: 1) the gradient of the second prediction mode is not 0; and 2) neither the first prediction mode nor the second prediction mode is the planar or DC prediction mode. If both conditions are not simultaneously satisfied, for the current prediction block, only the first prediction mode is used to calculate the prediction sample values of the current block. That is, the regular prediction process is applied to the first prediction mode. Otherwise, if both conditions are satisfied, the current prediction block will be derived using a weighted average approach. Exemplarily, a weight for planar mode is ⅓. A weight for the first prediction mode is calculated as ⅔ multiplied by the ratio of the gradient amplitude of the first prediction mode to the sum of the gradient amplitudes of the first and second prediction mode. A weight for the second prediction mode is calculated as ⅔ multiplied by the ratio of the gradient amplitude of the second prediction mode to the sum of the gradient amplitudes of the first and second prediction mode. The details are as follows.

$$\text{Weight(Planar)} = 1/3$$

$$\text{Weight}(mode1) = 2/3 * (amp1/(amp1+amp2))$$

$$\text{Weight}(mode2) = 1 - \text{Weight(Planar)} - \text{Weight}(mode1)$$

Noted that mode1 denotes the first prediction mode, mode2 denotes the second prediction mode, Weight (Planar) denotes the weight for the planar mode, Weight (mode1) denotes the weight for mode1 (i.e., the first prediction mode), Weight (mode2) denotes the weight for mode2 (i.e., the second prediction mode), amp1 denotes the gradient amplitude value of the first prediction mode, and amp2 denotes the gradient amplitude value of the second prediction mode.

Figure 4:
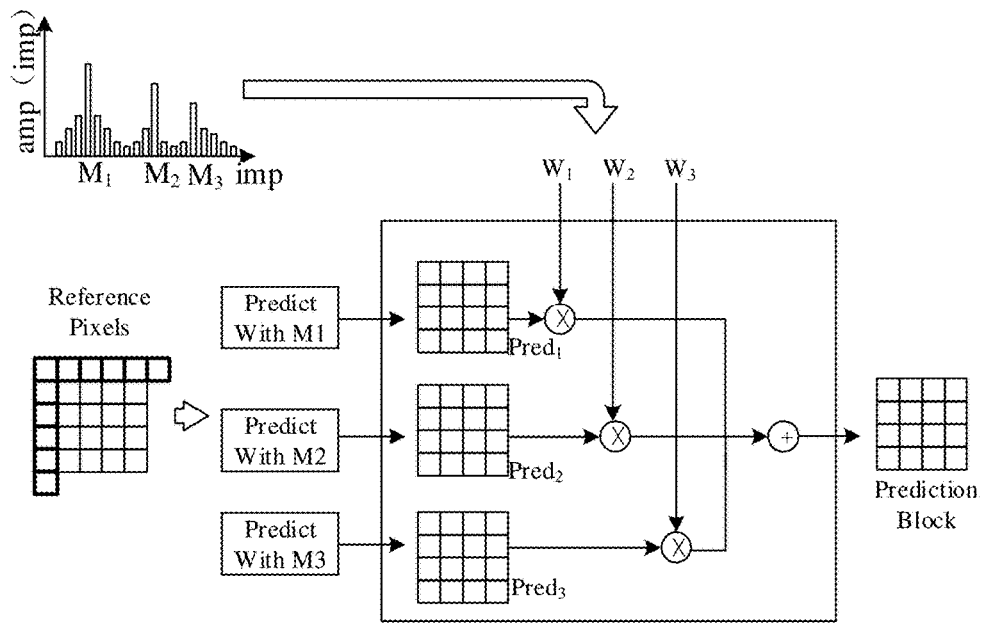
FIG. 4 illustrates an example of a process of generating a prediction value via DIMD.

Weighted average is performed for the above three prediction modes, i.e., the planar mode, first prediction mode and second prediction mode, to obtain the prediction block for the current coding unit. The decoding side obtains the prediction block in the same operations. The specific operation process is illustrated in FIG. 4 below. In addition, in the DIMD technology, the encoding side needs to transmit a flag to the decoding side for indicating whether the current coding unit uses the DIMD technology.

2) Matrix based intra prediction (MIP). In MIP technology, for a rectangular prediction block with width W and height H, MIP selects W reconstructed pixels in the row above the block and H reconstructed pixels in the column to the left of the block as input. If the pixels at these positions have not been reconstructed, the unreconstructed pixels at the positions are set to default values. For example, for a pixel of 10 bits, the default value for padding is 512.

Figure 5:
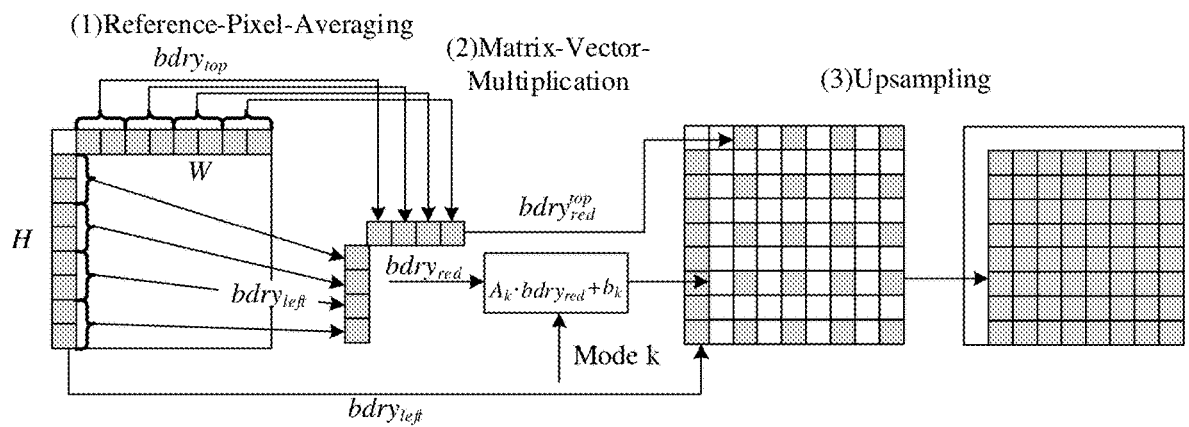
FIG. 5 illustrates an example of a process of generating a prediction value via MIP.

As illustrated in FIG. 5, MIP generates the prediction values mainly based on three operations as follows. (1) Spatial neighboring reconstructed samples are downsampled to obtain a sequence of downsampled samples. For example, the mean of the pixels in the row above the current block (denoted as $bdry_{top}$) and the column to the left of the current block (denoted as $bdry_{left}$) is calculated to obtain a reference pixel mean (denoted as $bdry_{red}$). (2) The output vector from the first operation is used as input. The input is multiplied by a predefined matrix vector, and added with a bias vector. For example, this may be expressed as $A_k \cdot bdry_{red} + b_k$, where $A_k$ is the $k^{th}$ trained weight matrix, and $b_k$ is the $k^{th}$ trained bias value, with k representing the MIP mode index. (3) The output vector from the second operation is used as input. Linear interpolation upsampling is performed to obtain a final predicted sample block that matches the actual number of samples of the coding unit.

MIP technology may be applied to blocks ranging in size from 4×4 to 64×64. The number of MIP prediction modes varies for coding units of different block sizes. Taking H.266/VVC as an example, MIP has 16 prediction modes for 4×4-sized coding units. MIP has 8 prediction modes for 8×8-sized coding units or coding units with width and height equal to 4. MIP has 6 prediction modes for coding units of other sizes. Moreover, MIP technology has a transpose function. For a prediction mode that matches the current size, MIP attempts transposition calculations at the encoding side. Therefore, MIP not only needs a flag for indicating whether the current coding unit uses MIP technology, but also needs to additionally transmit a transpose flag and a MIP mode index to the decoding side if the current coding unit uses MIP technology.

3) Template based intra mode derivation (TIMD). The technical principle of TIMD is similar to the technical principle of the above DIMD, both using the same operation to derive the prediction mode at the encoding side and decoding side to reduce the overhead of transmitting mode indexes. TIMD in ECM2.0 may be understood as two main parts. Firstly, the cost information of each prediction mode is calculated according to a template. The prediction mode corresponding to the minimum cost and the prediction mode corresponding to the second-minimum cost are selected. The prediction mode corresponding to the minimum cost is denoted as mode1, and the prediction mode corresponding to the second-minimum cost is denoted as mode2. If the ratio of the second-minimum cost (costMode2) to the minimum cost (costMode1) satisfies a preset condition, such as costMode2<2*costMode1, a weighted fusion is performed on the prediction block corresponding to mode1 and the prediction block corresponding to mode2 according to the preset weights. The preset weights are calculated based on the cost information as follows.

$$weight1 = costMode2/(costMode1 + costMode2)$$

$$weight2 = 1 - weight1$$

Noted that weight1 represents the weight for the prediction block corresponding to mode1, and weight2 represents the weight for the prediction block corresponding to mode2. However, if the ratio of the second-minimum cost (costMode2) to the minimum cost (costMode1) does not satisfy the preset condition, the weighted fusion between the prediction blocks is not performed, and the prediction block corresponding to mode1 is taken as the TIMD prediction block. The TIMD technology is illustrated in FIG. 6 below. If no available neighboring reconstructed sample is included in the TIMD template, the TIMD technology selects the planar mode for prediction, and the weighted fusion is not performed. Similar to DIMD, TIMD needs to transmit a flag to the decoding side for indicating whether the current coding unit uses TIMD technology.

From the above description, it can be seen that the technical principle of DIMD is similar to the technical principle of TIMD, both using the same operation to infer the prediction mode of the current coding unit at the decoding side and the encoding side. This decoding-side technology avoids transmission of prediction mode index with acceptable complexity, thereby reducing overhead and improving compression efficiency. However, due to the limitation of reference information and the fact that the tool itself does not have much part to improve the prediction quality, DIMD and TIMD work better in large areas with consistent texture characteristics. The technology does not perform well if the texture changes slightly or the template area cannot be covered.

In addition, both DIMD and TIMD technologies involves fusion or weighted prediction technologies. Fusion of prediction blocks may produce effects that cannot be achieved by a single prediction mode. The DIMD technology introduces planar mode as an additional weighted prediction mode, thereby increasing the spatial correlation between adjacent reconstructed samples and predicted samples. However, due to the simplicity of the prediction principle of planar mode, the weight for the planar mode prediction may have a counterproductive effect for prediction blocks with significant differences between the above right corner and bottom left corner.

As for the MIP technology, the MIP technology is simplified from neural network, and a prediction matrix of the MIP technology is obtained based on training, offering strong generalization capabilities and prediction effects unattainable by traditional prediction modes. For example, in some nonlinear texture regions, traditional prediction methods are often difficult to achieve satisfactory results, while MIP based on neural network technology has the potential to generate better prediction blocks. However, MIP not only needs to transmit the prediction mode index in the bitstream, but also needs to transmit the transpose flag, which requires substantial overhead.

Therefore, how to further improve the performance of video coding, e.g., to increase the compression efficiency and to reduce the transmission overhead, is an urgent problem to be solved.

Thus, embodiments of the present disclosure provide a coding method. An intra prediction mode parameter indicates that an intra prediction value is determined using a derivation mode. At least one first intra prediction mode may be determined according to the derivation mode, and a MIP mode for a first current block is determined. Then, an intra prediction value of the first current block is determined according to the at least one first intra prediction mode and the MIP mode. In embodiments of the present disclosure, the MIP technology can be combined with the derivation technology, so that the prediction technology based on the intra mode derivation and the prediction technology based on the neural network can be effectively combined, and the compression efficiency and performance are improved while the transmission overhead is reduced.

Exemplarily, the derivation mode may be DIMD or TIMD, and the disclosure is not limited in this regard.

The coding method provided in embodiments of the present disclosure are described in detail below with reference to the accompanying drawings.

FIG. 7 illustrates a schematic flowchart of a decoding method 300 provided in embodiments of the disclosure. The method 300 may be applied to a decoder, such as the decoder 200 in FIG. 2. Further, the method 300 may be applied to the intra prediction unit 222 in the decoder 200. As illustrated in FIG. 7, the method 300 includes operations 310 to 340.

At operation 310, an intra prediction mode parameter is obtained, where the intra prediction mode parameter indicates that an intra prediction value is determined using a derivation mode.

Exemplarily, the decoding side may obtain a bitstream, and obtain an intra prediction mode parameter from the bitstream, where intra prediction mode parameter may be used to indicate that an intra prediction value of the current block is determined using the derivation mode. The current block may be, for example, a first current block, or a second current block, which is not limited herein. Exemplarily, the current block may refer to a block currently being encoded or a coding block, such as a coding unit (CU), a prediction unit (PU), or the like, which is not limited herein. The current block may also be replaced by "coding block", "block", "current coding block", etc., all of which can represent the same or similar meaning.

Exemplarily, the derivation mode includes a DIMD mode or a TIMD mode. The disclosure is not limited in this regard. For details of DIMD or TIMD, reference can be made to descriptions above, which will not be repeated here.

In some optional embodiments, a derivation mode enable flag for indicating the derivation mode is enabled may be obtained, where the derivation mode enable flag is a sequence level flag. Optionally, in other embodiments, the derivation mode enable flag may also be a picture level flag or a slice level flag, and the disclosure is not limited in this regard.

Taking the derivation mode being the DIMD mode as a specific example, the decoding side may parse out a CU level type flag from the bitstream. If the flag indicates intra mode, the decoding side may parse out or obtain a DIMD enable flag. Exemplarily, the DIMD enable flag is a sequence level flag, with a specific syntax element that may be expressed as sps_dimd_enable_flag. If the DIMD enable flag is true, a DIMD use flag of the current CU is continued to be parsed out. If the DIMD use flag of the current CU is true, it is determined that an intra prediction value is determined for the current CU using the DIMD prediction mode.

In some optional embodiments, in the method 300, a first index may also be obtained, where the first index indicates that the intra prediction value is determined based on a combination of the derivation mode and the MIP mode.

Exemplarily, the decoding side may obtain an index from the bitstream. If the index is true (i.e., an example of the first index), the intra prediction value is determined based on a combination of the derivation mode and the MIP mode.

In some optional embodiments, in the method 300, a second index may also be obtained, where the second index indicates that the intra prediction value is determined based on the derivation mode.

Exemplarily, the decoding side may obtain an index from the bitstream. If the index is false (i.e., an example of the second index), the intra prediction value is determined based on the derivation mode.

As a specific example, when it is determined that the intra prediction value is determined for the current CU using the DIMD prediction mode, an index of DIMD is continued to be parsed out. If the index is 0 (i.e., a specific example of the second index), the intra prediction value is determined using the DIMD mode. If the index is 1 (i.e., a specific example of the first index), the intra prediction value is determined using a combination of the DIMD mode and the MIP mode.

In some optional embodiments, in the method 300, it may also be determined, according to a size of the current block, that the intra prediction value is determined based on the derivation mode and the MIP mode, or that the intra prediction value is determined based on the derivation mode.

As a specific example, when it is determined that the intra prediction value is determined for the current CU using the DIMD prediction mode, if the size of the current CU is greater than or equal to 32×32, the intra prediction value is determined using the DIMD mode, and if the size of the current CU is less than 32×32, the intra prediction value is determined using a combination of the DIMD mode and the MIP mode.

In some optional embodiments, in the method 300, it may also be determined, according to a frame type of a current frame, that the intra prediction value is determined based on the derivation mode and the MIP mode, or that the intra prediction value is determined based on the derivation mode.

As a specific example, when it is determined that the intra prediction value is determined for the current CU using the DIMD prediction mode, if the current frame is an I frame, the intra prediction value is determined using a combination of the DIMD mode and the MIP mode, and if the current frame is not an I frame, the intra prediction value is determined using the DIMD mode.

In embodiments of the present disclosure, whether the intra prediction value is determined based on the derivation mode and the MIP mode or based on the derivation mode is determined according to the size of the first current block and/or the frame type of the current frame, so that the encoding side does not need to transmit an index (or a flag) to the decoding side for indicating whether a combination of the DIMD mode and the MIP mode is used, thereby helping to reduce transmission overhead.

At operation 320, at least one first intra prediction mode is determined according to the derivation mode.

Exemplarily, when the derivation mode is the DIMD mode, the decoding side can calculate the histogram of gradients for each prediction mode. The action area is a preset area of adjacent reconstructed samples of the first current block. The prediction mode corresponding to the maximum amplitude value, denoted as mode1, and the prediction mode corresponding to the second-maximum amplitude value, denoted as mode2, are obtained.

As a possible implementation, the prediction mode corresponding to the maximum amplitude value (i.e., mode1) and the prediction mode corresponding to the maximum amplitude value (i.e., mode2) may serve as the at least one first intra prediction mode. For example, when neither the prediction mode1 nor the prediction mode2 is a planar mode or a DC mode, and the amplitude value corresponding to mode2 is greater than 0, the prediction mode1 and the prediction mode2 serve as the at least one first intra prediction mode.

At operation 330, a MIP mode for the first current block is determined.

In some optional embodiments, prior to operation 330, it may be determined that the intra prediction value of the first current block is determined based on the derivation mode and the MIP mode. For example, it may be determined, based on the obtained first index, and/or the size of the first current block, and/or the frame type of the current frame, that the intra prediction value of the first current block is determined using a combination of the DIMD mode and the MIP mode.

As a possible implementation, the MIP mode for the first current block may be determined according to a first prediction mode index for a reconstructed block. Optionally, a first transpose flag of a reconstructed block may be determined as the transpose flag corresponding to the first current block.

Exemplarily, surrounding (e.g., adjacent) reconstructed blocks of the first current block may be accessed in a certain order to determine whether there is a coding block using the MIP technology for intra prediction. If there is a coding block using the MIP technology, the MIP mode may be determined according to a prediction mode index of the reconstructed block of the coding block (i.e., an example of the first prediction mode index). Optionally, a transpose flag of the reconstructed block (i.e., an example of a first transpose flag) may also be determined as a transpose flag corresponding to the first current block.

Optionally, if there is a coding block using the MIP technology, a MIP prediction mode index of the earliest accessed reconstructed block in order is inherited. Optionally, the transpose flag of the reconstructed block may be further inherited.

Exemplarily, the reconstructed block surrounding the current block may include an above reconstructed block, a left reconstructed block, an above left reconstructed block, a bottom left reconstructed block, or an above right reconstructed block of the current block. For example, the reconstructed block may be a reconstructed block corresponding to at least some pixels among at least one row of above pixels, left pixels, above left pixels, bottom left pixels, or above right pixels of the current block.

Referring to FIG. 8, an example of reconstructed blocks surrounding the current block is illustrated, where adjacent blocks surrounding the current block have all been reconstructed. As illustrated in FIG. 8, reconstructed blocks surrounding the current block may include an above reconstructed block, a left reconstructed block, an above left reconstructed block, a bottom left reconstructed block, and an above right reconstructed block.

Exemplarily, the current block can inherit the MIP prediction mode index from its surrounding reconstructed blocks in the order of above→left→above right→above left→bottom left. For example, if the MIP use flag of the above reconstructed block is true, the current block inherits the MIP prediction mode from the above reconstructed block. If the MIP use flag of the above reconstructed block is false, continue to traverse the MIP use flag of the left reconstructed block in order until the MIP prediction mode is inherited or traversal is completed. Optionally, if the MIP prediction mode of the reconstructed block is inherited, the transpose flag of the reconstructed block may be further inherited.

Referring to FIG. 9, another example of reconstructed blocks surrounding the current block is illustrated, where adjacent blocks surrounding the current block have not been all reconstructed. As illustrated in FIG. 9, reconstructed blocks surrounding the current block may include an above reconstructed block and an above right reconstructed block, where a left reconstructed block, an above left reconstructed block, and a bottom left reconstructed block are unavailable.

Exemplarily, the current block can inherit the MIP prediction mode index from its surrounding reconstructed blocks in the order of above→above right. For example, if the MIP use flag of the above reconstructed block is true, the current block inherits the MIP prediction mode from the above reconstructed block. If the MIP use flag of the above reconstructed block is false, continue to traverse the MIP use flag of the above right reconstructed block in order. Optionally, if the MIP prediction mode of the reconstructed block is inherited, the transpose flag of the reconstructed block may be further inherited.

As another possible implementation, the MIP mode for the first current block may be determined according to a default MIP mode. Optionally, the transpose flag corresponding to the first current block may be determined according to a default second transpose flag. That is, a default MIP mode may be set as the MIP mode for the first current block. Exemplarily, the default MIP mode may be any of the prediction modes allowed for the first current block, which is not limited herein.

As an example, if, after traversal is completed, none of MIP use flags of the reconstructed blocks is true, the MIP mode for the first current block may be determined according to a default MIP mode. For example, the default MIP mode is used as the MIP mode for the first current block. Optionally, a default transpose flag may be determined as the transpose flag corresponding to the first current block.

As another example, if the MIP prediction mode inherited from an adjacent reconstructed block is unavailable for the size of the first current block, a default MIP mode may be used as the MIP mode for the first current block. Optionally, a default transpose flag may be further determined as the transpose flag of the first current block.

As another example, it may be predefined that the MIP mode for the first current block is determined according to a default MIP mode, and/or it may be predefined that the transpose flag corresponding to the first current block is determined according to a default second transpose flag.

As another possible implementation, a second prediction mode index may be obtained from a MIP prediction mode list, where the MIP prediction mode list includes a prediction mode index of at least one MIP mode associated with a current frame. The MIP mode for the first current block is determined according to the second prediction mode index.

Optionally, the MIP prediction mode list may further include at least one transpose flag corresponding to at least one MIP mode. The decoding side may obtain a third transpose flag from a MIP prediction mode list, and determine the third transpose flag as the transpose flag corresponding to the first current block.

Exemplarily, the MIP prediction mode list may be maintained for the current frame. The prediction mode index corresponding to at least one MIP mode in the MIP prediction mode list is sorted according to a number of times the MIP mode is used for intra prediction in the current frame, that is, the at least one MIP mode corresponds to statistical information related to the MIP prediction mode for the current frame. That is, in an intra prediction process of the current frame, a MIP prediction mode that appears more frequently, its corresponding prediction mode index is more preceding in the list. Optionally, the order of the transpose flag corresponding to at least one MIP mode may be the same as that of the at least one MIP mode.

In some embodiments, the second prediction mode index may be a prediction mode index sorted first in the MIP prediction mode list. Optionally, the third transpose flag may be a transpose flag sorted first in the MIP prediction mode list.

In some embodiments, the encoding side may transmit a target index to the decoding side, enabling the decoding side to parse out the target index and obtain a corresponding MIP prediction mode from the MIP prediction mode list. Optionally, the decoding side may further obtain a corresponding transpose flag according to the target index.

As a specific example, surrounding reconstructed blocks of the first current block may be accessed in a certain order to determine whether there is a coding block using the MIP technology for intra prediction. If there is a coding block using the MIP technology, a MIP prediction mode index and a transpose flag of the earliest accessed reconstructed block in order is inherited. Otherwise, a default MIP prediction mode0 is used, and the transpose flag is false.

It should be noted that, in embodiments of the disclosure, the encoding side does not need to transmit the prediction mode index and/or the transpose flag corresponding to the MIP mode for the first current block to the decoding side. Instead, the prediction mode index and/or transpose flag may be inherited from a reconstructed block (e.g., a surrounding reconstructed block or other reconstructed blocks). Optionally, a preset default value may be used. Therefore, embodiments of the present disclosure can eliminate the bit overhead of the MIP prediction mode index and the transpose flag, thereby improving the coding efficiency. Moreover, when the texture of the first current block is similar to the texture of the reconstructed block, coding performance may be further improved while saving the bit overhead.

At operation 340, an intra prediction value of the first current block is determined according to the at least one first intra prediction mode and the MIP mode.

The MIP technology can be combined with the conventional intra mode derivation technology. That is, an intra prediction value of the first current block, i.e., a prediction block of the first current block, is determined according to at least one first intra prediction mode and the MIP mode, where the at least one first intra prediction mode is determined according to the derivation mode.

Therefore, in embodiments of the present disclosure, an intra prediction mode parameter indicates that an intra prediction value is determined using a derivation mode. At least one first intra prediction mode may be determined according to the derivation mode. A MIP mode for a first current block may be determined. An intra prediction value of the first current block may be determined according to the at least one first intra prediction mode and the MIP mode. In embodiments of the present disclosure, the MIP technology may be combined with the derivation technology, so that the prediction technology based on the intra mode derivation and the prediction technology based on the neural network can be effectively combined, and the compression efficiency and performance are improved while the transmission overhead is reduced.

In some optional embodiments, at least one first prediction block obtained according to at least one first intra prediction mode and a second prediction block obtained based on the MIP mode may be merged to obtain a prediction block of the first current block. As a possible implementation, at least one first intra prediction value of the first current block in the at least one first intra prediction mode may be determined. A second intra prediction value of the first current block in the MIP mode may be determined. A weighted summation may be performed on the at least one first intra prediction value and the second intra prediction value to obtain the intra prediction value of the first current block.

Optionally, a weight combination associated with the at least one first intra prediction mode and the MIP mode for the first current block may be obtained. The weighted summation may be performed, according to the weight combination, on the at least one first intra prediction value and the second intra prediction value to obtain the intra prediction value of the first current block. Exemplarily, the weight combination may include a weight corresponding to the prediction block obtained according to at least one intra prediction mode and a weight corresponding to the prediction block obtained according to the MIP mode for the first current block.

Exemplarily, when the at least one first intra prediction mode includes mode1 and mode2, where neither mode1 nor mode2 is a planar or DC mode, and an amplitude value of mode2 is greater than 0, the intra prediction value of the first current block may be determined according to mode1 and mode2 obtained at operation 320 and the MIP mode for the first current block obtained at operation 330, and a weight combination associated with mode1, mode2, and the MIP mode for the first current block (i.e., a weight corresponding to each mode).

As an example, a weight corresponding to the MIP mode for the first current block may be set to be ⅝. A weight corresponding to mode1 may be obtained according to the proportion of amplitude value corresponding to mode1, and a weight corresponding to mode2 may be obtained according to the proportion of amplitude value corresponding to mode2. Here, after obtaining the weight for mode1 based on the proportion of amplitude value corresponding to mode1 and the weight for mode2 based on the proportion of amplitude value corresponding to mode2, the weights needs to be multiplied by ⅘ to obtain final weights corresponding to mode1 and weightmode2.

It should be noted that here, the weight of ⅝ corresponding to the MIP mode for the first current block, and the weights corresponding to mode1 and mode2 obtained according to the proportions of amplitude value corresponding to mode1 and mode2, are provided as an illustrative example. However, embodiments of the present disclosure are not limited in this regard. For example, the weight corresponding to mode1 and mode2 may be additionally defined, such as preset as a fixed weight, or calculated based on other information. Embodiments of the present disclosure are not limited in this regard. Exemplarily, if other information, such as an angular prediction mode for the reconstructed blocks surrounding the first current block, is similar to or the same as the first intra prediction mode, the weight for a non-planar mode or the MIP mode may be increased. Otherwise, the weight may be decreased.

In some embodiments, the at least one first intra prediction mode may be some or all of at least one intra prediction mode determined based on the derivation mode, which is not limited herein. Exemplarily, the intra prediction value of the first current block may be determined using both the two prediction modes (mode1 and mode2) derived from the DIMD mode and the MIP mode of the first current block. Alternatively, the intra prediction value of the first current block may be determined only using mode1 derived from the DIMD mode and the MIP mode of the first current block.

In some optional embodiments, a transpose flag corresponding to the first current block may be obtained. Then the second intra prediction value is determined according to the transpose flag.

As a possible implementation, a first transpose flag of a reconstructed block may be determined as the transpose flag corresponding to the first current block.

As another possible implementation, a default second transpose flag may be determined as the transpose flag corresponding to the first current block.

As another possible implementation, a third transpose flag may be obtained from a MIP prediction mode list, where the MIP prediction mode list includes at least one MIP mode associated with the current frame and at least one transpose flag corresponding to the at least one MIP mode. Then the third transpose flag is determined as the transpose flag corresponding to the first current block.

Specifically, for the method for obtaining the transpose flag corresponding to the first current block, reference can be made to descriptions above, which will not be repeated here.

In some optional embodiments, when the prediction mode1 or the prediction mode2 is a planar mode or a DC mode, or the amplitude value of mode2 is less than or equal to 0, mode1 may be used as the optimal prediction mode, and the prediction block corresponding to mode1 may be used as the final prediction block of the first current block.

In some optional embodiments, in the method 300, at least one second intra prediction mode can also be determined according to the derivation mode. Then an intra prediction value of a second current block, i.e., a prediction block of the second current block, may be determined according to the at least one second intra prediction mode. Here, the second current block of the prediction block is obtained according to a conventional derivation technology (e.g., DIMD).

In some optional embodiments, before determining the intra prediction value of the second current block, it may be determined that the intra prediction value of the second current block is determined based on the derivation mode. For example, it may be determined to determine the intra prediction value of the second current block using DIMD, based on the obtained second index, and/or the size of the second current block, and/or the frame type of the current frame.

Exemplarily, when the derivation mode is the DIMD mode, the decoding side can calculate the histogram of gradients for each prediction mode. The action area is a preset area of adjacent reconstructed samples of the second current block. The prediction mode corresponding to the maximum amplitude value, denoted as mode1, and the prediction mode corresponding to the second-maximum amplitude value, denoted as mode2, are obtained.

As a possible implementation, the prediction mode corresponding to the maximum amplitude value (i.e., mode1) and the prediction mode corresponding to the maximum amplitude value (i.e., mode2) may serve as the at least one second intra prediction mode. For example, when neither the prediction mode1 nor the prediction mode2 is a planar mode or a DC mode, and the amplitude value corresponding to mode2 is greater than 0, the prediction mode1 and the prediction mode2 serve as the at least one second intra prediction mode. Then, weighted average may be performed on the prediction block obtained based on mode1 and mode2. Exemplarily, the weight for the prediction block corresponding to the planar mode may first be fixed to ⅓. Then the weights for mode1 and mode2 are obtained according to their corresponding proportions of amplitude value and then multiplied by ⅔ to obtain their final weights. Finally, the weighted prediction block obtained from the planar mode, mode1, and mode2, according to their respective weights, is taken as the final prediction block for the second current block.

In some optional embodiments, when it is determined that the derivation mode is not used to determine the intra prediction value according to an intra prediction mode parameter (e.g., when the DIMD use flag obtained is false), the use flag or index information of other intra prediction technologies may continue to be parsed out. The intra prediction value of the current block may be obtained according to information parsed out.

In embodiments of the present disclosure, a bitstream may also be parsed, and residual information may be obtained. Temporal residual information may be obtained according to inverse quantization and inverse transform. The intra prediction value (i.e., the prediction block) of the current block (e.g., the first current block or the second current block) may be overlaid with the temporal residual information to obtain a reconstructed sample block of the current block. After all reconstructed sample blocks of the current frame are processed through technologies such as in-loop filtering, a final reconstructed picture may be obtained. The reconstructed picture may serve as video output and a reference for subsequent decoding.

Figure 10:
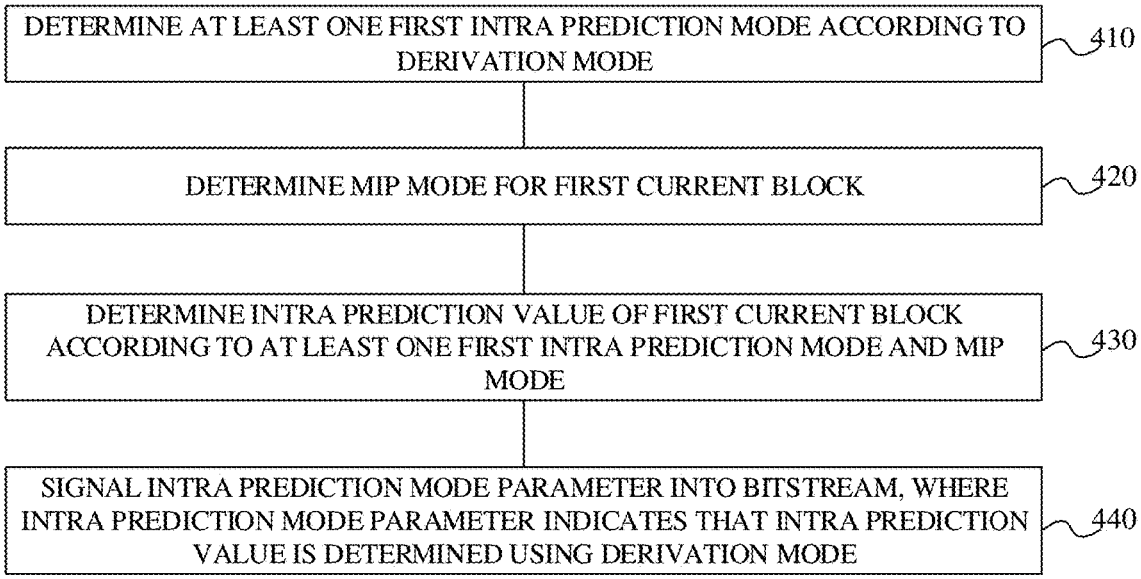
FIG. 10 is a schematic flowchart of an encoding method provided in embodiments of the disclosure.

FIG. 10 illustrates a schematic flowchart of an encoding method 400 provided in embodiments of the disclosure. The method 400 may be applied to an encoder, such as the encoder 100 in FIG. 1. Further, the method 400 may be applied to an intra prediction unit 112 in the encoder 100. As illustrated in FIG. 10, the method 400 includes operations 410 to 440.

At operation 410, at least one first intra prediction mode is determined according to a derivation mode.

Exemplarily, the derivation mode includes a DIMD mode or a TIMD mode. The disclosure is not limited in this regard. For details of DIMD or TIMD, reference can be made to descriptions above, which will not be repeated here.

Exemplarily, taking the derivation mode being the DIMD mode as an example, when the DIMD enable flag is true, i.e., DIMD technology is available for the current encoder, the intra prediction value may be determined based on a combination of the DIMD mode and the MIP mode. Exemplarily, the DIMD enable flag is a sequence level flag, with a specific syntax element that may be expressed as sps_dimd_enable_flag. In this case, at least one first intra prediction mode may be determined based on the DIMD mode. Exemplarily, the determination of the at least one first intra prediction mode based on the derivation mode may refer to the description of operation 320 in FIG. 7, which will not be repeated herein.

At operation 420, a MIP mode for a first current block is determined.

Exemplarily, when attempting to determine the intra prediction value based on the combination of the DIMD mode and the MIP mode, the MIP mode for the first current block is also need to be determined. Exemplarily, the determination of the MIP mode for the first current block may refer to the description of operation 330 in FIG. 7, which will not be repeated.

At operation 430, an intra prediction value of the first current block is determined according to the at least one first intra prediction mode and the MIP mode.

Exemplarily, the determination of the intra prediction value of the first current block according to the at least one first intra prediction mode and the MIP mode may refer to the description of operation 340 in FIG. 7, which will not be repeated.

Optionally, a rate-distortion cost, denoted cost1, may also be determined based on the intra prediction value of the first current block.

In some optional embodiments, when the DIMD enable flag is true, i.e., DIMD technology is available for the current encoder, the intra prediction value may also be determined based on DIMD mode. For example, at least one intra prediction mode may be determined based on the DIMD. An intra prediction value of the first current block may be determined based on at least one intra prediction mode. Optionally, a rate-distortion cost, denoted cost2, may also be determined based on that intra prediction value.

In some optional embodiments, the encoder may also continue to traverse other intra prediction technologies and calculate corresponding rate-distortion costs denoted as cost3 . . . costN.

At operation 440, an intra prediction mode parameter is signalled into a bitstream, where the intra prediction mode parameter indicates that the intra prediction value is determined using the derivation mode.

Exemplarily, when cost1 and cost2 are two minimum costs among all rate-distortion costs, it is determined that the derivation mode, such as a DIMD mode is used for the current coding block (e.g., the first current block). In this case, the derivation mode (e.g., DIMD) use flag may be set as true and signalled into the bitstream. Optionally, the derivation mode (e.g., DIMD) enable flag may be set as true and signalled into the bitstream. Exemplarily, the derivation mode enable flag is used for indicating that the derivation mode is enabled. The derivation mode enable flag is a sequence level flag, a picture level flag, or a slice level flag, which is not limited herein.

In some optional embodiments, in the method 400, a first index may also be signalled into the bitstream, where the first index indicates that an intra prediction value is determined based on a combination of the derivation mode and the MIP mode.

In some embodiments, if cost1 is the minimum cost, the index (e.g., a DIMD index as an example of the first index) is set to 1 and signalled into the bitstream, indicating that the intra prediction value is determined based on the combination of the derivation mode and the MIP. In other embodiments, if cost2 is the minimum cost, the index (e.g., a DIMD index) is set to 0 and signalled into the bitstream, indicating that the intra prediction value is determined based on the derivation mode.

Therefore, in embodiments of the present disclosure, at least one first intra prediction mode may be determined according to a derivation mode. A MIP mode for a first current block may be determined. An intra prediction value of the first current block may be determined according to the at least one first intra prediction mode and the MIP mode. An intra prediction mode parameter for indicating that the intra prediction value is determined using the derivation mode is signalled into a bitstream. In embodiments of the present disclosure, the MIP technology may be combined with the derivation technology, so that the prediction technology based on the intra mode derivation and the prediction technology based on the neural network can be effectively combined, and the compression efficiency and performance are improved while the transmission overhead is reduced.

In some optional embodiments, the intra prediction value of the first current block is determined according to the at least one first intra prediction mode and the MIP mode as follows. At least one first intra prediction value of the first current block in the at least one first intra prediction mode is determined. A second intra prediction value of the first current block in the MIP mode is determined. A weighted summation is performed on the at least one first intra prediction value and the second intra prediction value to obtain the intra prediction value of the first current block.

In some optional embodiments, the MIP mode for the first current block is determined as follows. The MIP mode for the first current block is determined according to a first prediction mode index for a reconstructed block.

In some optional embodiments, the MIP mode for the first current block is determined as follows. The MIP mode for the first current block is determined according to a default MIP mode.

In some optional embodiments, the MIP mode for the first current block is determined as follows. A second prediction mode index is obtained from a MIP prediction mode list, where the MIP prediction mode list includes a prediction mode index of at least one MIP mode associated with a current frame, determining the MIP mode for the first current block according to the second prediction mode index. The MIP mode for the first current block is determined according to the second prediction mode index.

In some optional embodiments, the second intra prediction value of the first current block in the MIP mode for the first current block is determined as follows. A transpose flag corresponding to the first current block is obtained. The second intra prediction value is determined according to the transpose flag.

In some optional embodiments, the transpose flag corresponding to the first current block is obtained as follows. A first transpose flag of a reconstructed block is determined as the transpose flag corresponding to the first current block.

In some optional embodiments, the transpose flag corresponding to the first current block is obtained as follows. A default second transpose flag is determined as the transpose flag corresponding to the first current block.

In some optional embodiments, the transpose flag corresponding to the first current block is obtained as follows. A third transpose flag is obtained from a MIP prediction mode list, where the MIP prediction mode list includes at least one transpose flag corresponding to at least one MIP mode associated with the current frame. The third transpose flag is determined as the transpose flag corresponding to the first current block.

In some optional embodiments, the reconstructed block includes an above reconstructed block, a left reconstructed block, an above left reconstructed block, a bottom left reconstructed block, or an above right reconstructed block of the current block.

In some optional embodiments, the prediction mode index corresponding to at least one MIP mode in the MIP prediction mode list is sorted according to a number of times the MIP mode is used for intra prediction in the current frame.

In some optional embodiments, the determination of an intra prediction value based on the derivation mode and the MIP mode is determined according to a size of the first current block and/or a frame type of a current frame. In this case, the first index may not need to be signalled into the bitstream.

In some optional embodiments, at least one second intra prediction mode can also be determined according to the derivation mode. An intra prediction value of a second current block is determined according to the at least one second intra prediction mode.

Exemplarily, taking the derivation mode being the DIMD mode as an example, when the DIMD enable flag is true, i.e., DIMD technology is available for the current encoder, the intra prediction value may be determined based on a combination of the DIMD mode and the MIP mode, or may also be determined based on DIMD mode. The rate-distortion cost corresponding to the intra prediction value determined based on the combination of the DIMD mode and the MIP mode is denoted as cost1. The rate-distortion cost corresponding to the intra prediction value determined based on DIMD modes is denoted as cost2. Optionally, the encoder may also continue to traverse other intra prediction technologies and calculate corresponding rate-distortion costs denoted as cost3 . . . costN.

Exemplarily, when cost1 and cost2 are the two minimum costs among all rate-distortion costs, it is determined that the derivation mode, such as a DIMD mode is used for the current coding block (e.g., the first current block). In this case, the derivation mode (e.g., DIMD) use flag may be set as true and signalled into the bitstream.

In some optional embodiments, in the method 400, a second index is signalled into the bitstream, where the second index indicates that an intra prediction value is determined based on the derivation mode.

In some embodiments, if cost2 is the minimum cost, the index (e.g., a DIMD index as an example of the second index) is set to 0 and signalled into the bitstream, indicating that the intra prediction value is determined based on the derivation mode. In other embodiments, if cost1 is the minimum cost, the index (e.g., a DIMD index as an example of the first index) is set to 1 and signalled into the bitstream, indicating that the intra prediction value is determined based on the combination of the derivation mode and the MIP.

In some optional embodiments, it is determined, according to a size of the second current block and/or a frame type of a current frame, that an intra prediction value is determined based on the derivation mode. In this case, the second index may not need to be signalled into the bitstream.

It is to be noted that in embodiments of the disclosure, the encoding method 400 may refer to the flow corresponding to the decoding method 300 described above, and will not be repeated herein. The encoding method provided in embodiments of the present disclosure can obtain a better prediction effect in the encoder 100, thereby improving the encoding performance. Accordingly, the decoding method provided in embodiments of the present disclosure may also improve the video decoding restoration quality in the decoder 200, thereby improving the decoding performance. Specifically, the encoding process and the decoding process may use the same preset rules or operations to calculate an intra prediction value of the current block.

Embodiments of the present disclosure are applicable to the intra prediction on the encoding side and decoding side. After integrating one embodiment of the present disclosure into the latest ECM 2.0, the test results under the general test condition (i.e., All Intra, AI) are illustrated in Table 1 below.

TABLE 1

| | All intra Main10 Over ECM-2.0 | | | | |
|---|---|---|---|---|---|
| | Y | U | V | EncT; | DecT |
| Class A1 | −0.12% | −0.07% | −0.16% | 112% | 113% |
| Class A2 | −0.08% | −0.02% | −0.03% | 109% | 111% |
| Class B | −0.08% | −0.03% | −0.07% | 117% | 96% |
| Class C | −0.06% | −0.05% | −0.06% | 114% | 91% |
| Class E | −0.07% | −0.10% | −0.13% | 118% | 93% |
| Over all | −0.08% | −0.03% | −0.02% | 114% | 99% |
| Class D | −0.06% | −0.04% | −0.05% | 114% | 97% |
| Class F | −0.05% | −0.18% | −0.10% | 104% | 94% |

As illustrated in Table 1, the present technology achieves performance improvements for all sequence classes of AI. The improvement for 4K sequences is most obvious (4K sequences are Class A1 and Class A2), with an average BD-bitrate saving of 0.1%, and the average AI performance reaching 0.08%. Since both DIMD and MIP technologies already exist in ECM, the hardware implementation already has circuits that can satisfy both technologies, so the technology does not bring additional burden on the decoding side.

The detailed description of the present disclosure has been described in detail with reference to the accompanying drawings. However, the present disclosure is not limited to the specific details in the above embodiments. Various simple modifications can be made to the technical solution of the present disclosure within the technical conception scope of the present disclosure, and these simple modifications all belong to the protection scope of the present disclosure. For example, each of the specific technical features described in the above specific embodiments may be combined in any suitable manner without contradiction, and various possible combinations are not further described in the present disclosure in order to avoid unnecessary repetition. For another example, any combination may be made between the various embodiments of the present disclosure, and the combination is likewise to be regarded as the disclosure of the present disclosure so long as it does not depart from the concept of the present disclosure.

It is further to be understood that, in various method embodiments of the present disclosure, the values of the sequence numbers of the above-described processes do not mean the sequence of execution, and the execution order of each process should be determined by its function and inherent logic, and should not limit the implementation of embodiments of the present disclosure. It is to be understood that these sequence numbers can be interchanged when appropriate, so that the embodiments of the disclosure can be implemented in an order other than those illustrated or described herein.

The method embodiments of the present disclosure are described in detail above with reference to FIG. 1 to FIG. 10 and the apparatus embodiments of the present disclosure are described in detail below with reference to FIG. 11 and FIG. 13.

Figure 11:
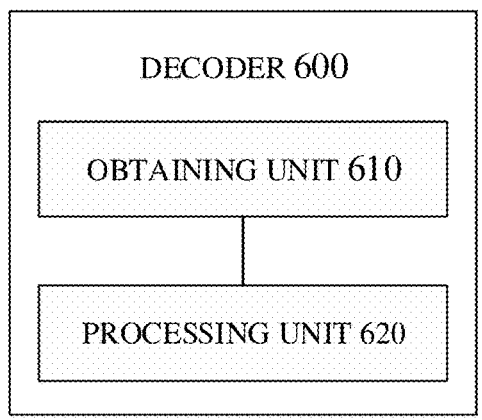
FIG. 11 is a schematic block diagram of a decoder provided in embodiments of the disclosure.

FIG. 11 is a schematic block diagram of a decoder 600 provided in embodiments of the disclosure. The decoder 600 is, for example, the decoder 200 in FIG. 2. As illustrated in FIG. 11, the decoder 600 may include an obtaining unit 610 and a processing unit 620.

The obtaining unit 610 is configured to obtain an intra prediction mode parameter for indicating that an intra prediction value is determined using a derivation mode.

The processing unit 620 is configured to determine at least one first intra prediction mode according to the derivation mode.

The processing unit 620 is further configured to determining a MIP mode for a first current block.

The processing unit 620 is further configured to determine an intra prediction value of the first current block according to the at least one first intra prediction mode and the MIP mode.

Optionally, the processing unit 620 is specifically configured to determine at least one first intra prediction value of the first current block in the at least one first intra prediction mode, determine a second intra prediction value of the first current block in the MIP mode for the first current block, and perform a weighted summation on the at least one first intra prediction value and the second intra prediction value to obtain the intra prediction value of the first current block.

Optionally, the processing unit 620 is specifically configured to determine the MIP mode for the first current block according to a first prediction mode index for a reconstructed block.

Optionally, the processing unit 620 is specifically configured to determine the MIP mode for the first current block according to a default MIP mode.

Optionally, the processing unit 620 is specifically configured to obtain a second prediction mode index from a MIP prediction mode list, where the MIP prediction mode list includes a prediction mode index of at least one MIP mode associated with a current frame, and determine the MIP mode for the first current block according to the second prediction mode index.

Optionally, the processing unit 620 is specifically configured to obtain a transpose flag corresponding to the first current block, and determine the second intra prediction value according to the transpose flag.

Optionally, the processing unit 620 is specifically configured to determine the first transpose flag of the reconstructed block as the transpose flag corresponding to the first current block.

Optionally, the processing unit 620 is specifically configured to determine the default second transpose flag as the transpose flag corresponding to the first current block.

Optionally, the processing unit 620 is specifically configured to obtain a third transpose flag from a MIP prediction mode list, where the MIP prediction mode list includes at least one transpose flag corresponding to at least one MIP mode associated with the current frame, and determine the third transpose flag as the transpose flag corresponding to the first current block.

Optionally, the reconstructed block includes an above reconstructed block, a left reconstructed block, an above left reconstructed block, a bottom left reconstructed block, or an above right reconstructed block of the current block.

Optionally, the prediction mode index corresponding to at least one MIP mode in the MIP prediction mode list is sorted according to a number of times the MIP mode is used for intra prediction in the current frame.

Optionally, the obtaining unit 610 is further configured to obtain a first index for indicating that an intra prediction value is determined based on a combination of the derivation mode and the MIP mode.

Optionally, the processing unit 620 is further configured to determine, according to a size of the first current block and/or a frame type of a current frame, that an intra prediction value is determined based on a combination of the derivation mode and the MIP mode.

Optionally, the processing unit 620 is further configured to determine at least one second intra prediction mode according to the derivation mode, and determine an intra prediction value of a second current block according to the at least one second intra prediction mode.

Optionally, the obtaining unit 610 is further configured to obtain a second index for indicating that an intra prediction value is determined based on the derivation mode.

Optionally, the processing unit 620 is further configured to determine, according to a size of the second current block and/or a frame type of a current frame, that an intra prediction value is determined based on the derivation mode.

Optionally, the obtaining unit 610 is further configured to obtain a derivation mode enable flag for indicating the derivation mode is enabled, where the derivation mode enable flag is a sequence level flag.

Optionally, the derivation mode includes a DIMD mode or a TIMD mode.

It may be understood that the apparatus embodiments and the method embodiments may correspond to each other, and similar descriptions may refer to the method embodiments. To avoid repetition, details are not repeated herein. Specifically, the decoder 600 in embodiments can execute the method 300 in embodiments of the present disclosure, and the aforementioned and other operations and/or functions of each module in the decoder 600 are configured to implement related operations of methods in FIG. 7. For the sake of brevity, the corresponding processes are not repeated herein.

Figure 12:
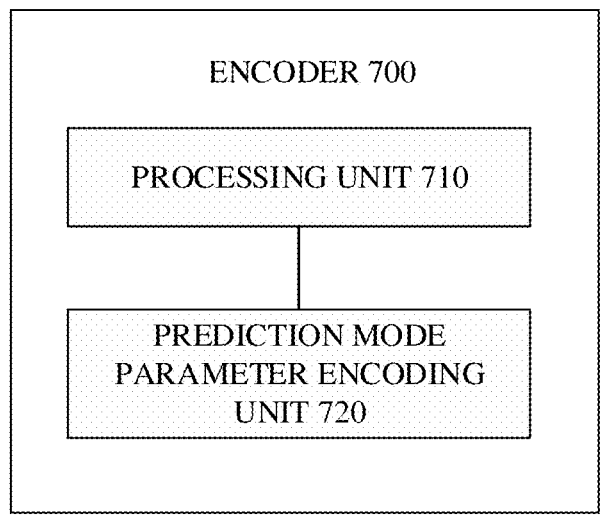
FIG. 12 is a schematic block diagram of an encoder provided in embodiments of the disclosure.

FIG. 12 is a schematic block diagram of an encoder 700 provided in embodiments of the disclosure. The encoder 700 is, for example, the encoder 100 in FIG. 1. As illustrated in FIG. 12, the encoder 700 may include a processing unit 710 and a prediction mode parameter encoding unit 720.

The processing unit 710 is configured to determine at least one first intra prediction mode according to a derivation mode.

The processing unit 710 is further configured to determining a MIP mode for a first current block.

The processing unit 710 is further configured to determine an intra prediction value of the first current block according to the at least one first intra prediction mode and the MIP mode.

The prediction mode parameter encoding unit 720 is configured to signal an intra prediction mode parameter into a bitstream, where the intra prediction mode parameter indicates that the intra prediction value is determined using the derivation mode.

Optionally, the processing unit 710 is specifically configured to determine at least one first intra prediction value of the first current block in the at least one first intra prediction mode, determine a second intra prediction value of the first current block in the MIP mode, and perform a weighted summation on the at least one first intra prediction value and the second intra prediction value to obtain the intra prediction value of the first current block.

Optionally, the processing unit 710 is specifically configured to determine the MIP mode for the first current block according to a first prediction mode index for a reconstructed block.

Optionally, the processing unit 710 is specifically configured to determine the MIP mode for the first current block according to a default MIP mode.

Optionally, the processing unit 710 is specifically configured to obtain a second prediction mode index from a MIP prediction mode list, where the MIP prediction mode list includes a prediction mode index of at least one MIP mode associated with a current frame, and determine the MIP mode for the first current block according to the second prediction mode index.

Optionally, the processing unit 710 is specifically configured to obtain a transpose flag corresponding to the first current block, and determine the second intra prediction value according to the transpose flag.

Optionally, the processing unit 710 is specifically configured to determine the first transpose flag of the reconstructed block as the transpose flag corresponding to the first current block.

Optionally, the processing unit 710 is specifically configured to determine the default second transpose flag as the transpose flag corresponding to the first current block.

Optionally, the processing unit 710 is specifically configured to obtain a third transpose flag from a MIP prediction mode list, where the MIP prediction mode list includes at least one transpose flag corresponding to at least one MIP mode associated with the current frame, and determine the third transpose flag as the transpose flag corresponding to the first current block.

Optionally, the reconstructed block includes an above reconstructed block, a left reconstructed block, an above left reconstructed block, a bottom left reconstructed block, or an above right reconstructed block of the current block.

Optionally, the prediction mode index corresponding to at least one MIP mode in the MIP prediction mode list is sorted according to a number of times the MIP mode is used for intra prediction in the current frame.

Optionally, the prediction mode parameter encoding unit 720 is further configured to signal a first index into the bitstream, where the first index indicates that an intra prediction value is determined based on a combination of the derivation mode and the MIP mode.

Optionally, the processing unit 710 is further configured to determine, according to a size of the first current block and/or a frame type of a current frame, that an intra prediction value is determined based on the derivation mode and the MIP mode.

Optionally, the processing unit 710 is further configured to determine at least one second intra prediction mode according to the derivation mode, and determine an intra prediction value of a second current block according to the at least one second intra prediction mode.

Optionally, the prediction mode parameter encoding unit 720 is further configured to signal a second index into the bitstream, where the second index indicates that an intra prediction value is determined based on the derivation mode.

Optionally, the processing unit 710 is further configured to determine, according to a size of the second current block and/or a frame type of a current frame, that an intra prediction value is determined based on the derivation mode.

Optionally, the prediction mode parameter encoding unit 720 is further configured to signal a derivation mode enable flag into the bitstream, where the derivation mode enable flag indicates that the derivation mode is enabled, and the derived-mode-enabled flag is a sequence level flag.

Optionally, the derivation mode includes a DIMD mode or a TIMD mode.

It may be understood that the apparatus embodiments and the method embodiments may correspond to each other, and similar descriptions may refer to the method embodiments. To avoid repetition, details are not repeated herein. Specifically, the encoder 700 in embodiments can execute the method 400 in embodiments of the present disclosure, and the aforementioned and other operations and/or functions of each module in the encoder 700 are configured to implement related operations of methods in FIG. 10. For the sake of brevity, the corresponding processes are not repeated herein.

The apparatus and system of embodiments of the present disclosure are described above from the perspective of functional modules with reference to the accompanying drawings. It may be understood that the functional modules may be implemented in the form of hardware, may also be implemented by instructions in the form of software, and may also be implemented by a combination of hardware and software modules. Specifically, each operation of the method embodiments in the present disclosure can be completed by an integrated logic circuit of the hardware in the processor and/or instructions in the form of software, and the operations of the method disclosed in embodiments of the disclosure can be directly executed by a hardware coding processor or a combination of hardware and software modules in the decoding processor. Optionally, the software module may be located in a mature storage medium in the field such as random access memory, flash memory, read-only memory, programmable read-only memory, electrically erasable programmable memory, and registers. The storage medium is located in the memory, and the processor reads the information from the memory, and completes the operations in the above method embodiments in combination with its hardware.

Figure 13:
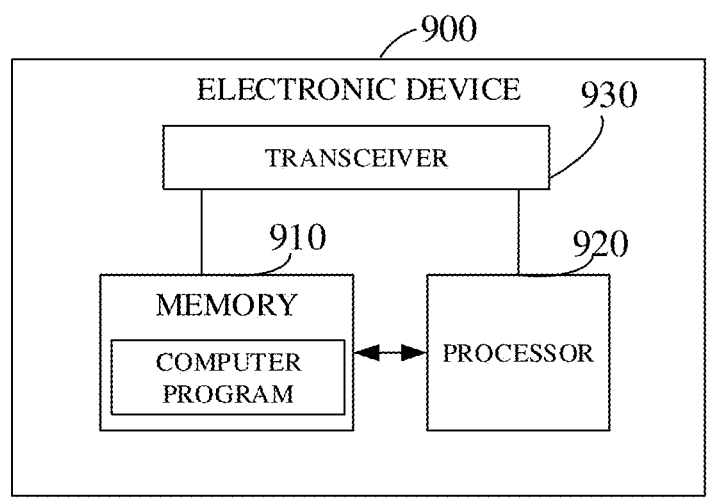
FIG. 13 is a schematic block diagram of an electronic device provided in embodiments of the disclosure.

FIG. 13 is a schematic block diagram of an electronic device 900 provided in embodiments of the present disclosure.

As illustrated in FIG. 13, the electronic device 900 may include a memory 910 and a processor 920. The memory 910 is configured to store a computer program and transmit the program code to the processor 920. In other words, the processor 920 can invoke and run the computer program from the memory 910 to implement the method in embodiments of the present disclosure.

For example, the processor 920 can be configured to execute the operations in the above-mentioned method 300 or method 400 according to the instructions in the computer program.

In some embodiments of the present disclosure, the processor 920 may include, but is not limited to: a general-purpose processor, digital signal processor (DSP), disclosure specific integrated circuit (ASIC), field programmable gate array (FPGA), or other programmable logic devices, discrete gates or transistor logic devices, discrete hardware components, and so on.

In some embodiments of the present disclosure, the memory 910 includes but is not limited to: volatile memory and/or non-volatile memory. The non-volatile memory can be a read-only memory (ROM), programmable read-only memory (PROM), erasable programmable read-only memory (EPROM), electrically programmable erase programmable read-only memory (EEPROM), or flash. The volatile memory may be random access memory (RAM), which acts as an external cache. By way of illustration and not limitation, many forms of RAM are available such as static RAM (SRAM), dynamic RAM (DRAM), synchronous DRAM (SDRAM), double data rate synchronous dynamic random access memory (DDR SDRAM), enhanced synchronous dynamic random access memory (enhanced SDRAM, ESDRAM), synchronous connection dynamic random access memory (synch link DRAM, SLDRAM) and direct memory bus random access memory (direct rambus RAM, DR RAM).

In some embodiments of the present disclosure, the computer program can be divided into one or more modules, and the one or more modules are stored in the memory 910 and executed by the processor 920 to complete the methods in the present disclosure. The one or more modules may be a series of computer program instruction segments capable of accomplishing specific functions, and the instruction segments are used to describe the execution process of the computer program in the electronic device 900.

As illustrated in FIG. 13, the electronic device 900 may also include a transceiver 930, where the transceiver 930 may be connected to the processor 920 or the memory 910.

The processor 920 can control the transceiver 930 to communicate with other devices, specifically, to send information or data to other devices, or receive information or data sent by other devices. The transceiver 930 may include a transmitter and a receiver. The transceiver 930 may further include antennas, and the number of antennas may be one or more.

It may be understood that the various components in the electronic device 900 are connected through a bus system, where the bus system includes not only a data bus, but also a power bus, a control bus, and a status signal bus.

According to one aspect of the present disclosure, a decoder is provided. The decoder includes a processor and a memory. The memory is configured to store a computer program, and the processor is configured to invoke and run the computer program stored in the memory to cause the decoder to execute the decoding method of the method embodiments described above.

According to one aspect of the present disclosure, an encoder is provided. The encoder includes a processor and a memory. The memory is configured to store a computer program, and the processor is configured to invoke and run the computer program stored in the memory to cause the encoder to execute the encoding method of the method embodiments described above.

According to one aspect of the present disclosure, a coding system is provided. The coding system includes the encoder and the decoder described above.

According to one aspect of the present disclosure, a bitstream is provided. The bitstream includes a intra prediction mode parameter and an intra prediction value of a first current block. The intra prediction mode parameter indicates that an intra prediction value is determined using a derivation mode. The intra prediction value of the first current block is determined according to at least one first intra prediction mode and a MIP mode, and the at least one first intra prediction mode is determined according to the derivation mode.

According to one aspect of the present disclosure, there is provided a computer storage medium having stored thereon a computer program that, when executed by a computer, causes the computer to perform the method of the method embodiments described above. Optionally, in embodiments of the disclosure, it is also provided a computer program product including instructions that, when executed by a computer, cause the computer to perform the method of the method embodiments described above.

According to another aspect of the present disclosure, a computer program product or computer program is provided. The computer program product or computer program includes computer instructions stored in a computer readable storage medium. A processor of a computer device reads the computer instructions from a computer-readable storage medium, and the processor performs the computer instructions so that the computer device performs the method of the method embodiments described above.

In other words, when implemented using software, the disclosure may be implemented in whole or in part in the form of a computer program product. The computer program product includes one or more computer instructions. When the computer program instructions are loaded and executed on the computer, the processes or functions according to embodiments of the present disclosure will be generated in whole or in part. The computer can be a general-purpose computer, a special-purpose computer, a computer network, or other programmable devices. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a digital video disc (DVD)), or a semiconductor medium (such as a solid state disk (SSD)), etc.

It is to be understood that in embodiments of the disclosure, "B corresponding to A" means that B is associated with A. In one implementation, B may be determined from A. However, it is further to be understood that determining B from A does not mean determining B from A alone, but may also be determined from A and/or other information.

In the description of the present disclosure, "at least one" refers to one or more, and "multiple" refers to two or more, unless otherwise stated. In addition, the term "and/or" describes an association relationship of associated objects and represents that three relationships may exist. For example, A and/or B may represent the following three cases: only A exists, both A and B exist, and only B exists. A and B may be singular or plural. The character "/" generally means that the associated objects has an "or" relationship. "At least one of the following" or similar expressions refers to any combination of these items, including any combination of single item or plural items. For example, at least one of a, b, or c may represent a, b, c, a-b, a-c, b-c, or a-b-c, where a, b, c may be single or multiple.

It is further to be understood that in embodiments of the disclosure, the description of first and second are for the purpose of illustrating and distinguishing the described objects only, and are not in any order, nor do they indicate any particular limitation to the number of devices in embodiments of the disclosure, and cannot constitute any limitation on embodiments of the present disclosure.

It is further to be understood that specific features, structures, or characteristics related to the embodiments in the description are included in at least one embodiment of the present disclosure. Further these specific features, structures or characteristics may be incorporated in any suitable manner in one or more embodiments.

In addition, the terms "including" and "having" and any variations thereof are intended to cover non-exclusive inclusion. For example, a process, method, system, product, or server including a series of operations or units need not be limited to those operations or units that explicitly listed, but may include other operations or units that are not explicitly listed or that are inherent to the process, method, product, or device.

Those skilled in the art can appreciate that the modules and algorithm operations of the examples described in conjunction with the embodiments disclosed herein can be implemented by electronic hardware, or a combination of computer software and electronic hardware. Whether these functions are executed by hardware or software depends on the specific disclosure and design constraints of the technical solution. Those skilled in the art may use different methods to implement the described functions for each specific disclosure, but such implementation may not be regarded as exceeding the scope of the present disclosure.

In the several embodiments provided in this disclosure, it may be understood that the disclosed devices, apparatuses, and methods may be implemented in other ways. For example, the apparatus embodiments described above are only illustrative. For example, the division of the modules is only a logical function division. In actual implementation, there may be other division methods. For example, multiple modules or components can be combined or can be integrated into another system, or some features may be ignored, or not implemented. In another point, the mutual coupling or direct coupling or communication connection illustrated or discussed may be through some interfaces, and the indirect coupling or communication connection of devices or modules may be in electrical, mechanical, or other forms.

A module described as a separate component may or may not be physically separated, and a component displayed as a module may or may not be a physical module, that is, it may be located in one place, or may be distributed to multiple network modules. Part or all of the modules can be selected according to actual needs to achieve the purpose of the solution of this implementation. For example, each functional module in each embodiment of the present disclosure may be integrated into one processing module, each module may exist separately physically, or two or more modules may be integrated into one module.

The above is only a specific implementation of the disclosure, but the scope of protection of the disclosure is not limited thereto. Those skilled in the art can easily think of changes or substitutions within the technical scope disclosed in the disclosure, which may be covered within the scope of protection of this disclosure. Therefore, the protection scope of the present disclosure may be based on the protection scope of the claims.

What is claimed is:

1. A decoding method, comprising:
    obtaining an intra prediction mode parameter for indicating that an intra prediction value is determined using a derivation mode;
    determining at least one first intra prediction mode according to the derivation mode;
    determining a matrix weighted intra prediction (MIP) mode for a first current block; and
    determining an intra prediction value of the first current block according to the at least one first intra prediction mode and the MIP mode.

2. The method of claim 1, wherein determining the intra prediction value of the first current block according to the at least one first intra prediction mode and the MIP mode comprises:
    determining at least one first intra prediction value of the first current block in the at least one first intra prediction mode;
    determining a second intra prediction value of the first current block in the MIP mode; and
    performing a weighted summation on the at least one first intra prediction value and the second intra prediction value to obtain the intra prediction value of the first current block.

3. The method of claim 1, wherein determining the MIP mode for the first current block comprises:
    determining the MIP mode for the first current block according to a first prediction mode index for a reconstructed block; or
    determining the MIP mode for the first current block according to a default MIP mode.

4. The method of claim 1, wherein determining the MIP mode for the first current block comprises:
    obtaining a second prediction mode index from a MIP prediction mode list, wherein the MIP prediction mode list comprises a prediction mode index of at least one MIP mode associated with a current frame; and
    determining the MIP mode for the first current block according to the second prediction mode index.

5. The method of claim 2, wherein determining the second intra prediction value of the first current block in the MIP mode comprises:
    obtaining a third transpose flag from a MIP prediction mode list, wherein the MIP prediction mode list comprises at least one transpose flag corresponding to at least one MIP mode associated with the current frame;
    determining the third transpose flag as a transpose flag corresponding to the first current block; and
    determining the second intra prediction value according to the transpose flag.

6. The method of claim 1, further comprising:
    obtaining a first index for indicating that an intra prediction value is determined based on a combination of the derivation mode and the MIP mode.

7. The method of claim 1, further comprising:
    determining at least one second intra prediction mode according to the derivation mode; and
    determining an intra prediction value of a second current block according to the at least one second intra prediction mode.

8. The method of claim 7, further comprising:
    obtaining a second index for indicating that an intra prediction value is determined based on the derivation mode.

9. The method of claim 1, further comprising:
    obtaining a derivation mode enable flag for indicating the derivation mode is enabled, wherein the derivation mode enable flag is a sequence level flag.

10. The method of claim 1, wherein the derivation mode comprises a decoder side intra mode derivation (DIMD) mode or a template based intra mode derivation (TIMD) mode.

11. An encoding method, comprising:
    determining at least one first intra prediction mode according to a derivation mode;
    determining a matrix weighted intra prediction (MIP) mode for a first current block;
    determining an intra prediction value of the first current block according to the at least one first intra prediction mode and the MIP mode; and
    signalling an intra prediction mode parameter into a bitstream, wherein the intra prediction mode parameter indicates that the intra prediction value is determined using the derivation mode.

12. The method of claim 11, wherein determining the intra prediction value of the first current block according to the at least one first intra prediction mode and the MIP mode comprises:
    determining at least one first intra prediction value of the first current block in the at least one first intra prediction mode; and
    determining a second intra prediction value of the first current block in the MIP mode; and
    performing a weighted summation on the at least one first intra prediction value and the second intra prediction value to obtain the intra prediction value of the first current block.

13. The method of claim 11, determining the MIP mode for the first current block comprises:
    determining the MIP mode for the first current block according to a first prediction mode index for a reconstructed block; or
    determining the MIP mode for the first current block according to a default MIP mode.

14. The method of claim 11, wherein determining the MIP mode for the first current block comprises:
    obtaining a second prediction mode index from a MIP prediction mode list, wherein the MIP prediction mode list comprises a prediction mode index of at least one MIP mode associated with a current frame; and
    determining the MIP mode for the first current block according to the second prediction mode index.

15. The method of claim 12, wherein determining the second intra prediction value of the first current block in the MIP mode comprises:
    obtaining a third transpose flag from a MIP prediction mode list, wherein the MIP prediction mode list comprises at least one transpose flag corresponding to at least one MIP mode associated with the current frame;
    determining the third transpose flag as a transpose flag corresponding to the first current block; and determining the second intra prediction value according to the transpose flag.

16. The method of claim 11, further comprising:
signalling a first index into the bitstream, wherein the first index indicates that an intra prediction value is determined based on a combination of the derivation mode and the MIP mode.

17. The method of claim 11, further comprising:
determining at least one second intra prediction mode according to the derivation mode; and
determining an intra prediction value of a second current block according to the at least one second intra prediction mode.

18. The method of claim 17, further comprising:
signalling a second index into the bitstream, wherein the second index indicates that an intra prediction value is determined based on the derivation mode.

19. The method of claim 11, wherein the derivation mode comprises a decoder side intra mode derivation (DIMD) mode or a template based intra mode derivation (TIMD) mode.

20. A non-transitory computer-readable storage medium storing a bitstream, the bitstream being generated according to the method of claim 11.

* * * * *